United States Patent Office 3,730,712
Patented May 1, 1973

3,730,712
PHOTOCONDUCTIVE MATERIAL FOR ELECTROGRAPHY
Kiyoshi Futaki, Kazuhiro Emoto, and Hirokazu Tsukahara, Kyoto, Japan, assignors to Mitsubishi Paper Mills, Ltd., Tokyo, Japan
No Drawing. Filed Mar. 1, 1971, Ser. No. 119,886
Claims priority, application Japan, Mar. 3, 1970, 45/17,645
Int. Cl. G03g 5/04, 5/06
U.S. Cl. 96—1.5        6 Claims

ABSTRACT OF THE DISCLOSURE

An excellent photosensitive material, which has a high sensitivity and has no strong absorption in the near ultraviolet region, may be obtained by use of a novel compound represented by the following general formula as the photoconductive substance for electrography:

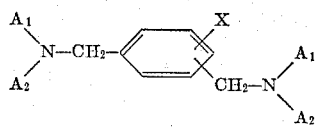

wherein $A_1$ is a phenyl group, $A_2$ is a phenyl or naphthyl group, X is hydrogen, a halogen, or a methyl, methoxy, or nitro group, and said phenyl or naphthyl group represented by $A_1$ and $A_2$ may contain substituents. The compound is readily synthesized and also has a high solubility in solvents.

---

The present invention relates to a novel compound suitable as photoconductive material for use in electrophotography and such photoconductive material.

There have been known, heretofore, electrographic materials composed of a support and a photoconductive layer containing as a photoconductive substance an inorganic compound such as selenium or zinc oxide, or an organic substance such as poly-N-vinylcarbazole as disclosed in Belgian Patent 588,050 and German Patents 1,068,115 and 1,158,367.

Furthermore, use of amine compounds as photoconductive substance has also been known in British Patent 1,030,220, U.S. Patents 3,180,730 and 3,245,783 and Japanese patent publication No. 4,156/68. However, photoconductive materials according to these prior arts have had poor sensitivity and unsatisfactory compatibility. That present invention has improved these disadvantages of the conventional techniques.

According to the present invention, there may be obtained a photosensitive material having an excellent sensitivity and stability by use of a novel photoconductive compound represented by the following general formula, which is quite different from the above-said conventional photoconductive substances:

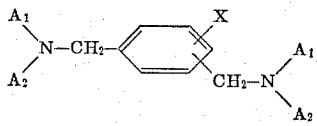

wherein $A_1$ is a phenyl group, $A_2$ is a phenyl or naphthyl group, X is hydrogen, a halogen, or a methyl, methoxy, or nitro group, and said phenyl or naphthyl group represented by $A_1$ and $A_2$ may contain in its nucleus at least one substituent selected from halogen, nitro, lower alkyl having 1 to 4 carbon atoms, lower alkoxy having 1 to 4 carbon atoms, carboxyl, and phenyl. The preferable compounds for use in the present invention are derivatives of p- or m-xylenediamine.

The purpose of synthesizing the novel compound for use in this invention may be accomplished by adding a diarylamine derivative and an $\alpha,\alpha'$-dichloroxylene derivative into ethyl alcohol containing dissolved potassium hydroxide, and heating the mixture for approximately ten hours under reflux.

For example, 3.5 g. of $\alpha,\alpha'$-dichloro-p-xylene and 9 g. of diphenylamine are added into 15 cc. of ethyl alcohol containing 4.0 g. of potassium hydroxide dissolved therein, and heated for 10 hours under reflux. Then about 50 cc. of water is added thereto, and the crude crystals that separate are washed with alcohol, and recrystallized from ethyl alcohol to obtain 5.0 g. of slightly greenish needle crystals having a melting point of 186.0–186.5° C.

By similar procedures, there may be synthesized

N,N,N',N'-tetra(4',4'',4''')-tetrachloro)-phenyl-m-xylenediamine,
N,N,N',N'-tetraphenyl-p-(2-nitro)-xylenediamine,
N,N'-diphenyl-N,N'-dinaphthyl-p-xylenediamine,
N,N,N',N'-tetra(2,2''-dimethoxy)phenyl-p-xylenediamine, etc.

These compounds are synthesized more easily than conventional photoconductive sensitive materials, and are readily soluble not only in high boiling organic solvents such as monochlorobenzene, nitrobenzene, etc., but also in low boiling solvents such as benzene, chloroform, toluene, etc., which simplifies the coating and drying operations mentioned hereinafter. In applying these compounds to the electrographic sensitive material, they are used along with natural or synthetic resins, in the form of a transparent and homogeneous solid solution. Resins to be used for this purpose may be addition polymers such as polyvinyl chloride, polystyrene, polyvinylidene chloride, etc., or condensation polymers such as phenolic resins, alkyd resins, polycarbonate, polysulfone, etc. The amount of resin to be used is 50 to 500 parts per 100 parts of the above-said compound.

As the sensitizer there may be used generally those substances which have heretofore been known in the electrographic processes including as the spectral sensitizers coloring matters such as Methylene Blue, Crystal Violet, Rhodamine G, Rhodamine 6G, Night Blue, etc., and as the chemical sensitizer, maleic acid, maletic anhydride, phthalic acid, phthalic anhydride, quinones such as p-quinone, naphthoquinone, or 2-methylanthraquinone, and phenols such as p-nitrophenol, p-carboxyphenol, m-chlorophenol, etc. These compounds are used each alone or in combination of two or more of them. The amount to be used is 0.01 to 0.5 part, preferably 0.03 to 0.3 part of a spectral sensitizing coloring matter and 1 to 50 parts, preferably 3 to 30 parts of a chemical sensitizer per 100 parts of the above-mentioned synthesized sensitive agent.

The above-mentioned sensitizers and resins (bonding agents) are added to the synthesized sensitive agent. The mixture is dissolved in suitable solvents such as benzene, toluene, chloroform, or monochlorobenzene, and coated on a suitable support such as metal, paper or plastic foil by means of the rotating coating method, brush coating method, doctor blade method or other known methods. The coated material is dried by means of a dryer. After applying a positive or negative corona discharge to the electrographic sensitive sheet thus obtained, the latent image is printed thereon with, for example, a white light, and thereafter the development can be effected by spraying a developing powder. Alternatively, the development can be effected by the known liquid development process. The present electrographic photosensitive sheet having a coated layer as thin as $1\mu$ can be used satisfactorily and the present photoconductive compound does not show an intensive absorption in the near ultraviolet region. Hence, when a tracing paper is used as the support, the present sensitive sheet can be used for a secondary original in the diazo print process.

As disclosed in the foregoing, compared with conventional photoconductive substances, the present photoconductive compounds have excellent characteristics such as higher sensitivity, easier synthesis, better solubility, and no intensive absorption in the near ultraviolet region.

The invention is illustrated below by refering to examples.

EXAMPLE 1

One gram of N,N,N',N'-tetraphenyl-p-xylene-diamine, 1 g. of polystyrene resin, 0.002 g. of Crystal Violet, and 0.2 g. of p-nitrophenol were dissolved in 10 cc. of chloroform. The solution was coated on an aluminum sheet to form a photosensitive layer, $5\mu$ in thickness after drying. After having been loaded with a negative charge by exposure to corona discharge at 5 kv., the sensitive material was placed under a positive original and exposed to light for 0.5 second, the illumination having been 500 lux. Then the exposed material was sprayed with a developing powder to form a visible image which closely reproduced the original with excellent resolution. The image thus formed could be fixed on the aluminum support by gentle heating.

EXAMPLE 2

One gram of N,N,N',N'-tetraphenyl-m-xylenediamine, 1.5 g. of polycarbonate resin, 0.002 g. of Night Blue, and 0.2 g. of p-nitrophenol were dissolved in 10 cc. of chloroform. The solution was coated on a paper, which had been undercoated with a conductive agent, to obtain a sensitive layer, $5\mu$ in thickness after drying. After having been loaded with a charge in a similar manner to that in Example 1, the sensitive material was exposed to a tungsten light for 0.2 second, the illumination having been 500 lux, and then developed by the liquid development process to obtain a clear-cut visible image. By gentle heating, the image could be fixed on the paper. When a thin paper, such as, for example, tracing paper, which had an undercoat, was used as the supporting paper, the developed paper could serve as a secondary original for the diazo printing.

EXAMPLE 3

One gram of N,N,N',N'-tetra(4,4',4'',4'''-tetrachloro) phenyl - p - xylenediamine, 1 g. of polysulfone resin, 0.0015 g. of Crystal Violet, and 0.1 g. of 4-chloro-m-cresol were dissolved in 15 cc. of chloroform. The solution was coated on a paper, which had been undercoated with a conductive agent, to obtain a sensitive layer, $5\mu$ in thickness after drying. After having been loaded with a charge in a manner similar to that in Example 1, the sensitive material was exposed to a white light for 0.5 second, the illumination having been 500 lux, and then sprayed with a developing powder for reversal processing to obtain a clear-cut reversed image.

EXAMPLE 4

One gram of N,N'-diphenyl-N,N'-dinaphthyl-p-xylenediamine, 2 g. of polystyrene resin, 0.002 g. of Crystal Violet, and 0.2 g. of p-nitrophenol were dissolved in a mixed solvent containing 5 g. of chloroform and 5 g. of monochlorobenzene. The solution was coated on an aluminum sheet to obtain a sensitive layer, $7\mu$ in thickness after drying. After having been loaded with a negative charge by corona discharge, the sensitive material was placed under a positive original and exposed to light for one second, the illumination having been 500 lux. Then the exposed material was sprayed with a developing powder to obtain a visible image which closely reproduced the original. The image could be fixed by gentle heating.

EXAMPLE 5

One gram of 4-chloro-$\alpha$-$\alpha'$-bis(N,N-diphenylamino)m-xylene, 0.8 g. of polystyrene, 0.001 g. of crystal violet and 0.05 g. of 4-chloro-m-xylenol were dissolved in 8 cc. of chloroform. Thus obtained solution was applied to a paper base subjected to conduction treatment to form a photosensitive film in an amount of 2.5 g./m.², after drying. Thus obtained photosensitive material was charged in accordance with the procedure as in Example 1 and exposed with white light of 500 lux for 2 seconds. Thus exposed photoconductive material was treated in accordance with the liquid developing process and then fixed with trichloroethylene. Thus obtained image had high density and showed little fog. According to the conventional method (e.g. Japanese patent publication No. 4,156/68) required 4–5 seconds of exposure with 500 lux.

What is claimed is:
1. A novel compound suitable as photoconductive material represented by the general formula:

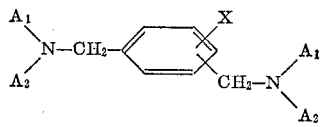

wherein $A_1$ is a phenyl group, $A_2$ is a group selected from phenyl and naphthyl groups, X is a member selected from hydrogen, halogens, methyl group, methoxy group and nitro group and said $A_1$ and $A_2$ may contain at least one substituent selected from halogens, nitro, lower alkyls having 1 to 4 carbon atoms, lower alkoxys having 1 to 4 carbon atoms, carboxyl and phenyl.

2. A photoconductive material according to claim 1, including resin in the amount of 50 to 500 parts per 100 parts of the compound.

3. A novel compound according to claim 1, which is selected from derivatives p- or m-xylenediamine.

4. A photoconductive sheet which comprises a support and the photoconductive material of claim 1.

5. A photoconductive material which comprises a resin, the compound of claim 1 and a sensitizer.

6. A photoconductive material which comprises from 50 to 500 parts resin, from 0.01 to 0.5 part spectral sensitizer and from 1 to 50 parts chemical sensitizer, per 100 parts of the compound of claim 1.

References Cited

UNITED STATES PATENTS

| | | | |
|---|---|---|---|
| 2,363,134 | 11/1944 | McCleary | 260—570.9 |
| 2,604,399 | 7/1952 | Donovan et al. | 260—570.9 |
| 3,072,603 | 1/1963 | Tholstrup | 260—576 |

FOREIGN PATENTS

| | | | |
|---|---|---|---|
| 39/11,546 | 11/1961 | Japan | 96—1.5 |

OTHER REFERENCES

Kearns: Kinetics and Mechanism of Photoconductivity of Metal-Free Phthalocyanine, p. 7.

CHARLES E. VAN HORN, Primary Examiner

M. B. WITTENBERG, Assistant Examiner

U.S. Cl. X.R.

96—1.6; 252—501; 260—576